H. SAURER.
SPEED REGULATING DEVICE FOR AUTOMOBILES AND THE LIKE.
APPLICATION FILED SEPT. 11, 1911.
Reissued Jan. 2, 1912. 13,348.
3 SHEETS—SHEET 1.
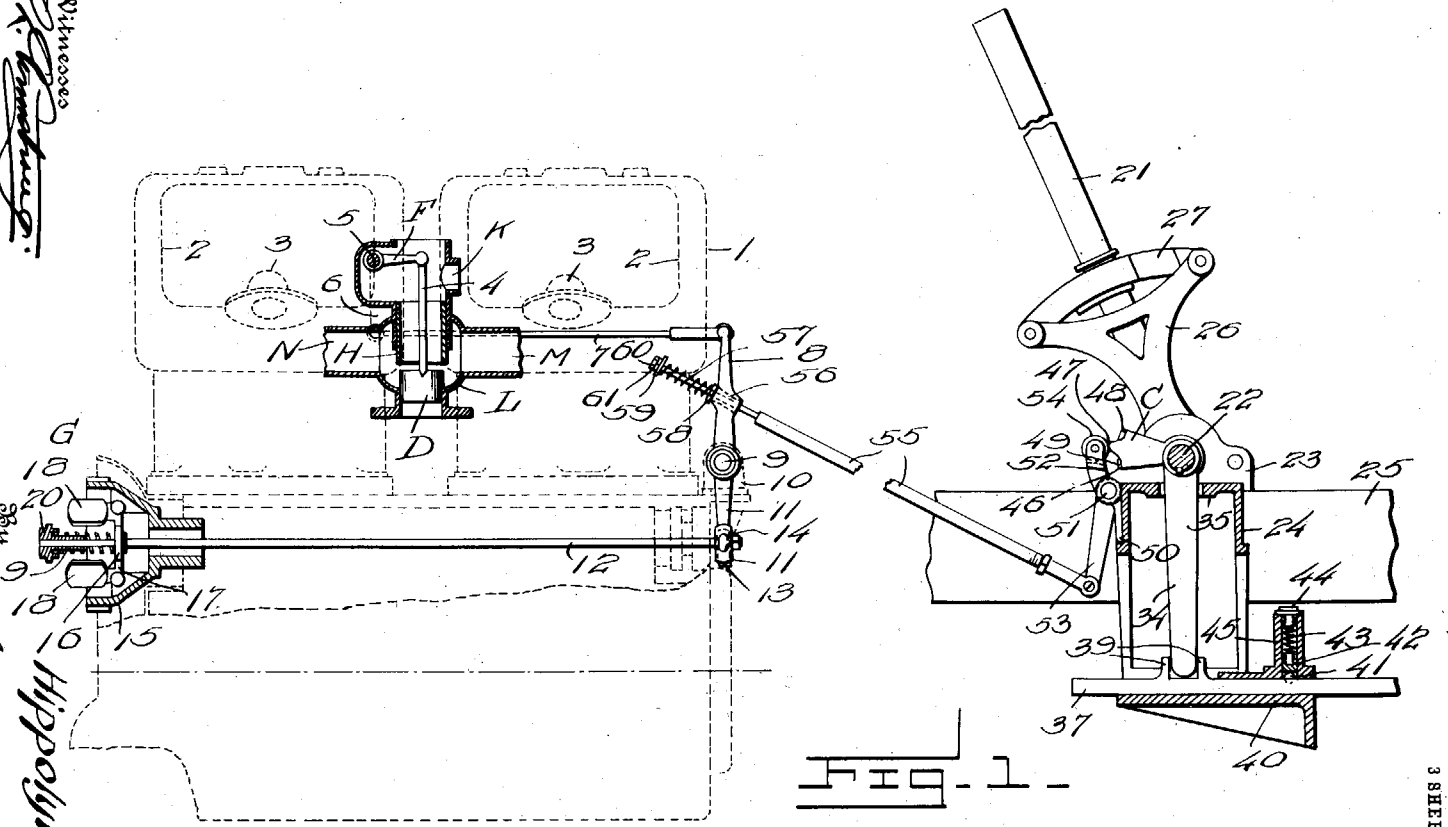
Witnesses
R. R. Armstrong
Helen S. Morris
Inventor
Hippolyt Saurer,
By Howard A. Coombs
Attorney

H. SAURER.

SPEED REGULATING DEVICE FOR AUTOMOBILES AND THE LIKE.

APPLICATION FILED SEPT. 11, 1911.

Reissued Jan. 2, 1912.

13,348.

3 SHEETS—SHEET 2.

Inventor

Hippolyt Saurer,

Witnesses

C. R. Armstrong

Helen S. Morris

By Howard A. Coombe

Attorney

H. SAURER.

SPEED REGULATING DEVICE FOR AUTOMOBILES AND THE LIKE.

APPLICATION FILED SEPT. 11, 1911.

Reissued Jan. 2, 1912.

13,348.

3 SHEETS—SHEET 3.

Inventor

Hippolyt Saurer,

Witnesses

L. L. Armstrong.

Helen S. Morris.

By Howard A. Coombs

Attorney

UNITED STATES PATENT OFFICE.

HIPPOLYT SAURER, OF ARBON, SWITZERLAND.

SPEED-REGULATING DEVICE FOR AUTOMOBILES AND THE LIKE.

13,348. Specification of Reissued Letters Patent. Reissued Jan. 2, 1912.

Original No. 976,834, dated November 22, 1910, Serial No. 516,712. Application for reissue filed September 11, 1911. Serial No. 648,773.

*To all whom it may concern:*

Be it known that I, HIPPOLYT SAURER, a citizen of the Confederation of Switzerland, residing at Arbon, in Switzerland, have invented a new and useful Speed-Regulating Device for Automobiles and the Like, of which the following is a specification.

My invention relates to a speed regulating device for automobiles and the like, the motors of which are provided with governors.

I will now proceed to describe my invention with reference to the accompanying drawings, in which—

Figure 3:
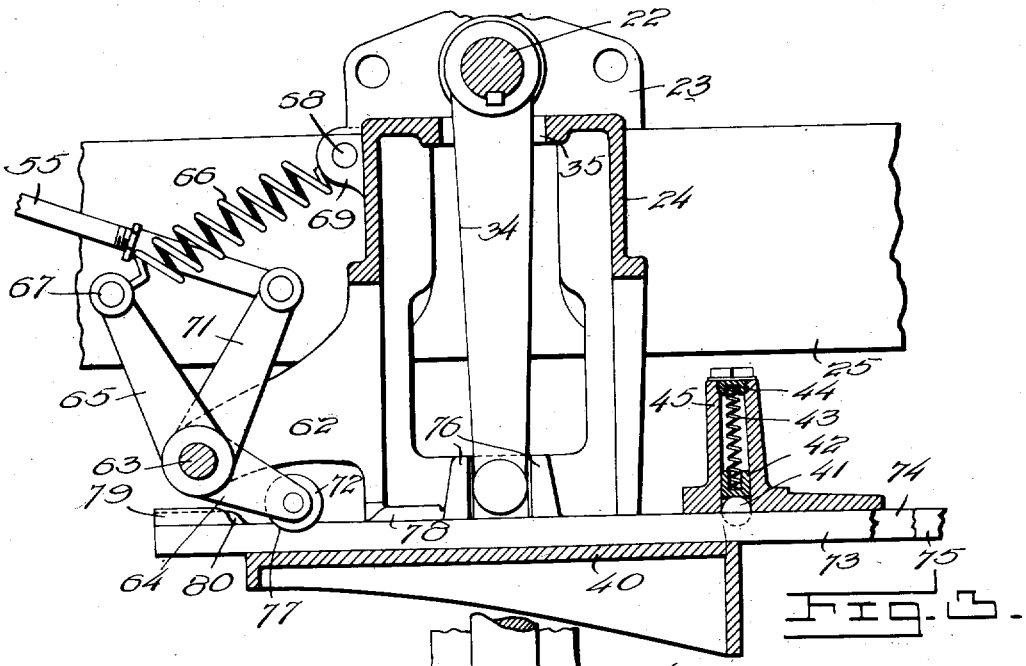
Figure 4:
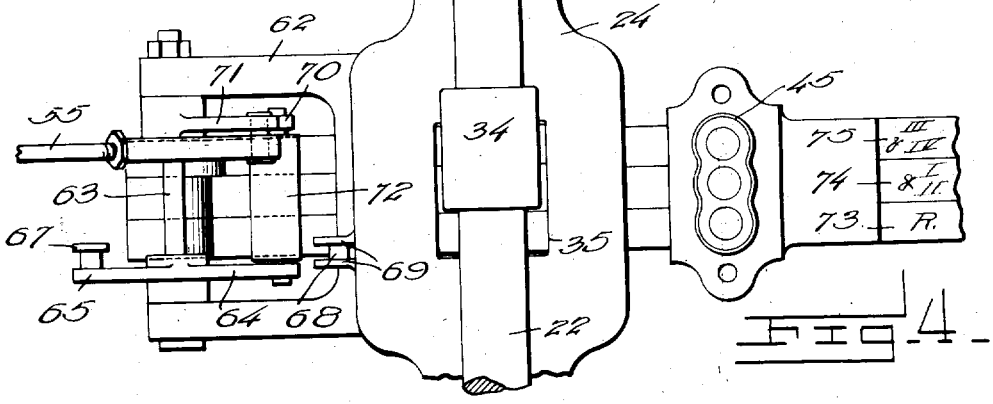
Figure 5:
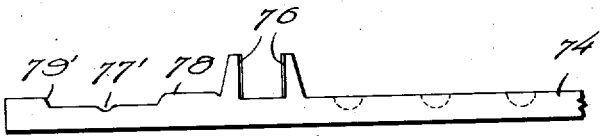
Figure 2:
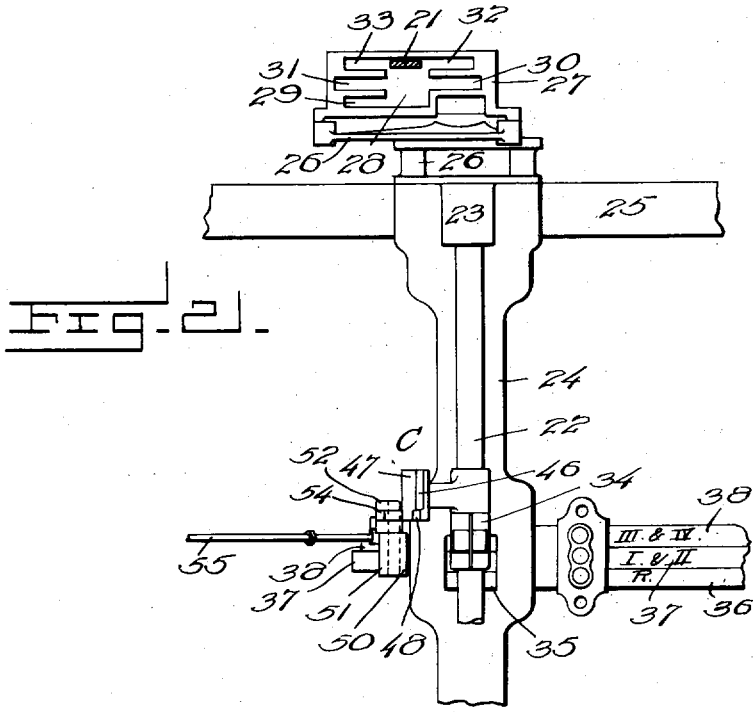
Figure 6:
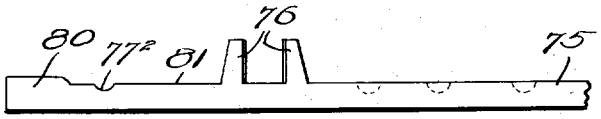
Figure 7:
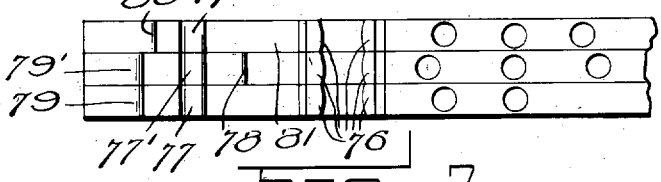

Figure 1 is an elevation of the speed regulating device in combination with the governor, the distributing valve, the parts connecting the valve with the governor, the gearing-in lever and parts of the push-bars, the motor being merely indicated by dotted lines, Fig. 2 is a plan view, showing the gearing-in lever in section, part of its axle with one bearing, part of the speed regulating device and the above mentioned parts of the push-bars, Fig. 3 shows a portion of Fig. 1 on a larger scale illustrating a modified speed-regulating device, Fig. 4 is a plan view of the same, the helical spring being omitted for the sake of clearness, Figs. 5 and 6 show in elevation parts of two push-bars, and Fig. 7 is a plan view of the juxtaposed three push-bars.

Similar characters of reference refer to similar parts throughout the several views.

The motor 1 is indicated by dotted lines in Fig. 1.

D is a tubular regulating piston-valve mounted in the lower cylindrical part of the box L to reciprocate and is rigidly connected with a vertical rod 4 which is pivotally connected with a forked lever F. On the end of the shaft 5 of this lever F outside the box L is fastened an arm 6 which can be operated from the governor G by means of a connecting rod 7, an arm 8 fastened on a shaft 9 rocking in bearings 10, a forked arm 11 fastened on this shaft 9, a rod 12 and a ring 13 (containing a ball-bearing or the like) engaging with its two pivots 14 in the forked arm 11. The rod 12 carries at its left end a disk 16, which is pivotally connected with the arms 17, 17 of the two oscillating weights 18, 18. A helical spring 19 is inserted between the disk 16 and a recessed ring 20 which is secured in a suitable yoke fastened on the inside of the gear wheel 15.

It will be seen, that for the normal speed of the motor the weights 18, 18 of the governor G, the two arms 11 and 8, the two arms 6 and F, and the piston-valve D will occupy their middle positions shown. When the speed of the motor decreases, the helical spring 19 will push the disk 16 with the rod 12 from left to right, so that the two weights 18, 18 will approach to the center line of the rod 12 and the arm F will lower the piston-valve D. An increase of the speed will reverse the described motions of the parts.

H denotes a second valve which is adapted to coöperate with the regulating piston-valve D, it being under the control of the driver.

In any case it is only essential, that the governor G can so operate the piston-valve D as to normally maintain a constant number of revolutions per unit of time of the motor.

21 represents the usual gearing-in lever fastened on a horizontal shaft 22, which is mounted to rock and to move longitudinally in two bearings 23 at the ends of a cross support 24 secured on the frame 25 of the automobile or the like. For want of space only one of the two bearings 23 and a part of the cross support 24 are shown in Fig. 2. A suitable bracket 26 is attached to the bearing 23 and carries an arched guide 27 for the gearing-in lever 21. The guide 27 has a middle opening 28 and five recesses 29, 30, 31, 32, 33 communicating therewith. It will be seen that, when the gearing-in lever 21 occupies its middle position shown in Fig. 1, it can be pushed through the opening 28 in either direction parallel to the shaft 22. A vertical lever 34 is fastened on the shaft 22 about in its middle and passes through a slot 35 in the cross support 24. Its rounded-off free end engages between the projections 39, 39 of any of three juxtaposed push-bars 36, 37, 38, which are guided in a suitable guide 40 attached to the cross support 24 and can be severally secured in their middle position shown and in either of their extreme positions by means of three locking devices of any known construction. These locking devices are shown as each consisting of a ball 41, a piston 42, a helical spring 43, and a securing nut 44, all of which are disposed in a suitable casing 45. Each helical spring 43 inserted between the piston 42 and the nut 44 is adapted to press the ball 41 on the push-bar, so that this ball can engage in either of two recesses for the push-bar 36 or in any of three recesses (see Fig. 7) for either of the bars 37 and 38. The three push-bars 36, 37, 38 extend into a gearing box of any known construction, in which they are each provided with an arm (not shown). The bar 36 actuates the reverse gear, while bars 37 and 38 actuate four different transmission ratios designated I, II, III, and IV in a manner to be described.

From an examination of Fig. 2 it will be clear, that the gearing-in lever 21 occupies such a position in the guide 27, that it can engage either in the recess 33 for the transmission-ratio IV or in the recess 32 for the ratio III. When the gearing-in lever 21 is shifted in the opening 28 of the guide 27 into the vertical plane of the two recesses 30 and 31, of course the shaft 22 will be at the same time shifted, so that its lever 34 engages between the projections 39, 39 of the push-bar 37 and the latter can be pushed by the gearing-in lever 21 into either extreme position for the ratio I or II. When the gearing-in lever 21 is pushed to the other end of the opening 28, it can engage in the recess 29 for reversing the direction of the vehicle. All the parts described in connection with the gearing-in lever 21 are already known.

According to my invention a special connection is inserted between the gearing-in lever 21 and the parts connecting the governor G with the distributing piston-valve D as follows: A cam C is fastened on the shaft 22 close to the lever 34. Its surface parallel to the shaft 22 is for the most part concentric with the latter, only that in its middle a high tapering projection 47 is provided, which extends over the whole of its length parallel to the shaft 22. A concentric surface 48, of about half the height of the projection 47, is provided along one edge of the cam C on the upper side of the projection 47, while another surface 49 of less height (Fig. 4) is provided on the lower side. The concentric surface of the smaller radius is denoted by 46. A plate 50 attached to the cross support 24 carries a pin 51, on which a two-armed lever 52, 53, is mounted to rock. The upper arm 52 of this lever is forked and carries a roller 54, which is adapted to bear against the cam C and to roll on it. The lower arm 53 is pivotally connected with a rod 55, which passes through a slot 56 in the arm 8 and carries on the other side of the latter a helical spring 57, that is inserted between a disk 58 bearing against the arm 8 and another disk 59 bearing against two adjusting nuts 60, 61.

When the gearing-in lever 21 occupies the position shown in Fig. 2, in which it can engage either the transmission ratio IV for the maximum speed of the vehicle or the other ratio III for the next lower speed of the vehicle, the roller 54 bears normally against the middle projection 47 and either against the surface 48 for the ratio IV or against the surface 49 for the ratio III. When the gearing-in lever 21 occupies the position in the central plane of the two recesses 30 and 31 in the guide 27, in which it can engage either the transmission-ratio II for the next lower speed or the other ratio I for the minimum speed of the vehicle, the roller 54 bears normally against the projection 47 and either against the upper side of the surface 46 or against the lower side of the same. When the gearing-in lever 21 occupies the position in the central plane of the recess 29, in which it can reverse the direction of the vehicle, the roller 54 bears normally against the projection 47 and in the other extreme position against the upper side of the surface 46.

The helical spring 57 may be so adjusted, that for the middle position of the gearing-in lever 21 (in which no transmission-ratio is engaged and the roller 54 bears against the middle projection 47) the tension of the governor spring 19 is so much counteracted as to turn the arm 8 to the right through a certain angle and by the parts 7, 6, 5, F, 4 to raise the piston-valve D so much as to reduce the speed of the motor to a certain limit, whereby the motor under no load is prevented from running fast. When the gearing-in lever 21 is so placed as to engage the transmission-ratio IV for the maximum speed of the vehicle, the roller 54 will bear against the projection 48, so that the helical spring 57 will be only a little relieved, and in consequence of this the piston-valve D will be so much lowered as to increase slightly the speed of the motor. When the gearing-in lever 21 is so placed as to engage the transmission-ratio III for the next lower speed of the vehicle, the roller 54 will bear against the lowest surface 49 of the cam, so that the helical spring 57 will be further relieved and the piston-valve D will be further lowered, whereby the speed of the motor is further increased.

When the gearing-in lever 21 is so shifted as to engage the transmission-ratio II or I, or to reverse the direction of the vehicle, the roller 54 will bear against the corresponding side of the surface 46, so that the helical spring 57 may be fully or nearly relieved and the governor G will so operate the piston-valve D as to maintain the normal speed of the motor.

In this manner it is possible to give the motor three different speeds, for example 500 revolutions per minute, when the transmission ratio IV for the maximum speed of the vehicle is engaged, or 750 revolutions per minute, when the transmission ratio III for the next lower speed of the vehicle is engaged, or 1000 revolutions per minute, when the transmission-ratio II or I for the next lower speed and the minimum speed respectively of the vehicle is engaged. When the driver wants to drive his vehicle uphill, he may by his lever 21 engage the transmission-ratio I or II according to the inclination of the road, the motor running at 1000 revolutions per minute. When the driver wants to drive his vehicle on horizontal roads or downhill, he may by his lever 21 engage the transmission-ratio III or IV, when the motor will run at 750 or 500 revolutions per minute. Thus the driver in spite of his liberty to use the gearing-in lever 21 will never be able to increase the speed of his vehicle beyond the predetermined limit.

It is obvious, that the speed regulating device so far described can be varied in many respects without departing from the spirit of my invention. The construction of the motor 1 is immaterial to my invention. The surface on the cam C can be varied and disposed on other places according to the requirements of the circumstances.

The cam C may be omitted and the push-bars can be arranged to operate the speed regulating device as follows: The cross support 24 may be provided with two brackets 62, 62 see Figs. 3 and 4, in which a shaft 63 is mounted to rock. A bent lever 64, 65 is fastened on this shaft 63, and a helical spring 66 connects a pin 67 on the arm 65 with another pin 68 in suitable lugs 69 provided on the cross support 24. Another bent lever 70, 71 is fastened on the shaft 63 and a roller 72 is mounted to turn with its two pivots in the two arms 64 and 70, while the other arm 71 of the lever 70 71 is pivotally connected with the rod 55. Three juxtaposed push-bars 73, 74, 75 are provided, which differ from those 36, 37, 38 only in so far that they are lengthened on the left side of the projections 76, 76 and are provided with the following recesses and projections. The push-bar 73 marked R for the reversal of the direction of the vehicle has at the left end a high projection 79 and at a distance therefrom a recess 77 in which the roller 72 normally engages. The push-bar 74 for the transmssion-ratios I and II has a recess 77′ for the roller 72 and on both sides two high projections 79′ and 78 (Fig. 5) of the same height as that of 79. The push-bar 75 for the transmission-ratios III and IV has a recess $77^2$ and at the left end a low projection 80 (Fig. 6). When all the three push-cars 73, 74, 75 occupy their normal position shown, the three recesses 77, 77′, $77^2$ are made to register with one another, so that the roller 72 can engage in all of them at a time. The helical spring 66 is made stronger than that 57, so that it will always press the roller 72 into the recesses 77, 77′, $77^2$. From a comparison of Fig. 3 with Fig. 1 it will be evident, that the recesses 77, 77′, $77^2$ of the three push-bars 73, 74, 75 produce the same effect upon the governor G as the middle projection 47 on the cam C. When by the lever 34 the push-bar 74 is shifted from its normal position to its left extreme position, high projection 78, so that the spring 57 and consequently also the governor spring 19 will be relieved, whereby the speed of the motor is increased from its minimum to its maximum. The same effect will be produced, if the push-bar 74 is shifted from its normal position to its right extreme position and the roller 72 bears on the projection 79′. When after returning the push-bar 74 to its normal position the gearing-in lever 21 is so shifted as to move the push-bar 75 from its normal position to its extreme right position, the roller 72 will move out of the recess $77^2$ and bear on the low projection 80. Thereby the two springs 57 and 19 will be relieved for increasing the speed of the motor from its minimum to an amount somewhat short of the maximum. When the push-bar 75 is shifted from its normal position to its extreme left position, the roller 72 will bear on the face 81, so that the two springs 57 and 19 will be less relieved than before and the speed of the motor will be increased only a little beyond its minimum. It is evident, that the three projections 78, 79, 79′ correspond to the surface 46 of the cam C, while the low projection 80 of the push-bar 75 corresponds to the surface 49 on the cam C and the surface 81 on the bar 75 corresponds to the surface 48 on the cam C, as the several effects thereby produced will be the same for the respective cases.

It is obvious that the cam C as well as the parts of the push-bars 73, 74, 75 on the left of their projections 76, 76, can be varied according to the circumstances for obtaining the effect, that the speed of the vehicle does not exceed a predetermined limit in any case, whether the vehicle is driven uphill or on horizontal roads or downhill, the speed of the motor and the several transmission-ratios at disposal being taken into consideration.

I claim:

1. The combination with a fluid operated motor, a governor therefor, and a shaft driven thereby, change-gears between said motor and shaft, and means for shifting said gears, of a valve connected to said governor to control the supply of fluid to said motor and connections between said gear-shifting means and the connections between said valve and governor, whereby the effect of the governor on the valve is varied by shifting the gears.

2. The combination with a fluid operated motor, a governor therefor and a shaft driven thereby, change-gears between sa motor and shaft, and means for shifting said gears, of a valve connected to said governor to control the supply of fluid to said motor, said gear-shifting means comprising cam-surfaces, a lever mounted to be rocked by contact with said surfaces, and a rod yieldingly connecting said lever and the connections between said valve and governor, whereby the effect of the governor on the valve is varied by shifting the gears.

3. In a device of the class described, the combination with the motor, a governor therefor and means controlled by the governor to vary the speed of the motor, of change gears driven by said motor, means to shift the same and connections between said shifting means and said governor, whereby shifting the gears controls the effect of the governor on the motor.

HIPPOLYT SAURER.

Witnesses:

HEINRICH MAYER,

C. A. RUSS.